(12) United States Patent
Wise et al.

(10) Patent No.: US 12,522,340 B2
(45) Date of Patent: Jan. 13, 2026

(54) AIRCRAFT SIDEWALL HAVING CABIN WINDOWS WITH INSULATING SEALS

(71) Applicant: The Boeing Company, Arlington, VA (US)

(72) Inventors: Nicole R. Wise, Snohomish, WA (US); John Scott Black, Cle Elum, WA (US); Gregory A. Tubbs, Marysville, WA (US); Phillip E. Pacini, Bothell, WA (US); Mark Allan Stadum, Marysville, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/754,779

(22) Filed: Jun. 26, 2024

(65) Prior Publication Data

US 2026/0001641 A1   Jan. 1, 2026

(51) Int. Cl.
  *B64C 1/14*   (2006.01)
(52) U.S. Cl.
  CPC ................. *B64C 1/1484* (2013.01)
(58) Field of Classification Search
  CPC ........ B64C 1/1484; B64C 1/1492; B64C 1/14
  See application file for complete search history.

(56) References Cited

U.S. PATENT DOCUMENTS

| | | | |
|---|---|---|---|
| 7,552,896 B2 | 6/2009 | Coak | |
| 9,902,483 B2* | 2/2018 | Zahlen | B32B 3/08 |
| 10,183,735 B2 | 1/2019 | Gideon et al. | |
| 11,952,099 B2 | 4/2024 | Blom-Schieber et al. | |
| 2007/0095984 A1 | 5/2007 | Wood | |
| 2008/0078877 A1* | 4/2008 | Switzer | B64C 1/1492 |
| | | | 244/129.3 |
| 2011/0042516 A1* | 2/2011 | Dolzinski | B64C 1/1492 |
| | | | 244/129.3 |
| 2017/0137105 A1* | 5/2017 | Roth | B64C 1/40 |
| 2023/0166826 A1 | 6/2023 | Keck et al. | |
| 2023/0242236 A1* | 8/2023 | Best | B64C 30/00 |
| | | | 244/129.3 |
| 2024/0199231 A1 | 6/2024 | Dressler et al. | |

FOREIGN PATENT DOCUMENTS

EP  2718181 B1  8/2016

OTHER PUBLICATIONS

1 Extended European Search Report, dated Jun. 20, 2025, regarding EP Application No. 25175543.5, 11 pages.

* cited by examiner

*Primary Examiner* — Joshua J Michener
*Assistant Examiner* — Cindi M Curry
(74) *Attorney, Agent, or Firm* — Yee & Associates, P.C.

(57) ABSTRACT

A window assembly for an aircraft fuselage includes a seal surrounding the periphery of a window in a cabin sidewall. The seal fills voids within the sidewall and forms a physical and thermal barrier against cold air within the sidewall cavity from reaching the window.

20 Claims, 14 Drawing Sheets

AIRCRAFT SIDEWALL HAVING CABIN WINDOWS WITH INSULATING SEALS

BACKGROUND INFORMATION

1. Field

The present disclosure generally relates to thermal load management in windows, and deals more particularly with an aircraft sidewall having cabin windows with a surrounding seal that insulates the window from cold air.

2. Background

Aircraft operating in low temperature environments such as those encountered at high altitudes employ various types of insulation within sidewalls of the aircraft's fuselage in order to insulate the cabin from the cold outside temperatures. The windows used in these aircraft typically use two windowpanes separated by an air gap order to prevent transmission of cold temperatures into the cabin through the window. Blankets of insulation placed inside the sidewalls also reduce the transmission of cold air along the outer skin into the cabin.

Insulating the cabin is more challenging in some newer aircraft designs that use thinner sidewalls in order to increase cabin width. For example, structural components of a fuselage such as frame members can be sculptured in order to increase cabin width by reducing sidewall thickness. Reduced sidewall thickness makes insulating the cabin against cold intrusion more difficult because of the limited space available between the aircraft's outer skin and the cabin. Higher performance insulation can be used in the sidewalls, however voids and air leaks exist in the sidewalls that nevertheless allow cold air to travel to the window around its periphery. The cold air reaching the periphery of the window is conducted into the cabin, and can also result in window icing.

Accordingly, it would be desirable to provide a window assembly design for aircraft cabin windows having a surrounding seal that insulates the periphery of the window against cold air.

SUMMARY

The disclosure relates in general to aircraft cabin windows, and more specifically to a window design that incorporates a seal around the periphery of the window that insulates the window from cold temperatures within the aircraft's sidewalls. One advantage of the disclosed embodiments is that the seal forms both a physical and thermal barrier completely surrounding a cabin window. Another advantage is that the seal can be used to insulate windows in cabins having sculptured sidewalls with reduced thicknesses. Another advantage is that the seal can be easily constructed using common techniques such as molding. A further advantage is that the seal is lightweight, relatively inexpensive to produce, and can reduce the amount of other insulating materials used in cabin sidewalls.

According to one aspect, a window assembly is provided for aircraft having an outer skin and an inner sidewall panel separated by a sidewall cavity. The window assembly includes a window frame configured to be attached to the outer skin. A window is mounted on the window frame and a seal surrounds the window inside the sidewall cavity. The seal is configured to form a barrier preventing cold air inside the cavity from reaching the window.

According to another aspect, an aircraft fuselage is provided having an outer skin and an inner sidewall panel separated from the outer skin by sidewall cavity. The sidewall cavity includes insulation configured to thermally insulate the inner sidewall from the outer skin. The fuselage has at least one window frame attached to the outer skin, and a window mounted within the window frame. A seal surrounds the window and is configured to insulate the window from the sidewall cavity.

According to still another aspect, a method is provided of insulating an aircraft cabin window from cold air inside the sidewall cavity. The method comprises installing a seal around the window in face-to-face contact with a sidewall of the cabin.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figure 1:
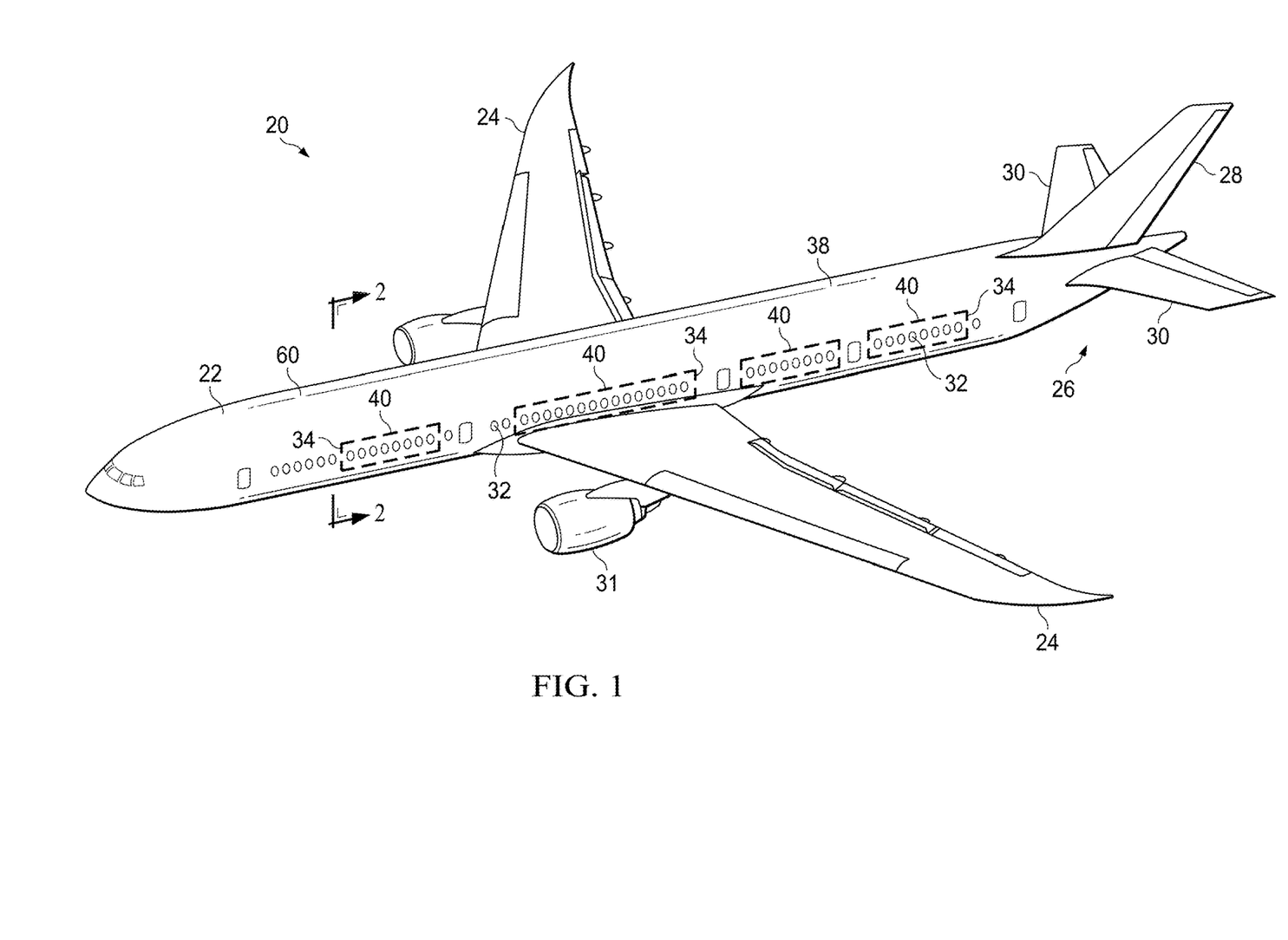
FIG. 1 is an illustration of a perspective view of an airplane, sculptured areas of the fuselage 22 shown in broken lines.
Figure 2:
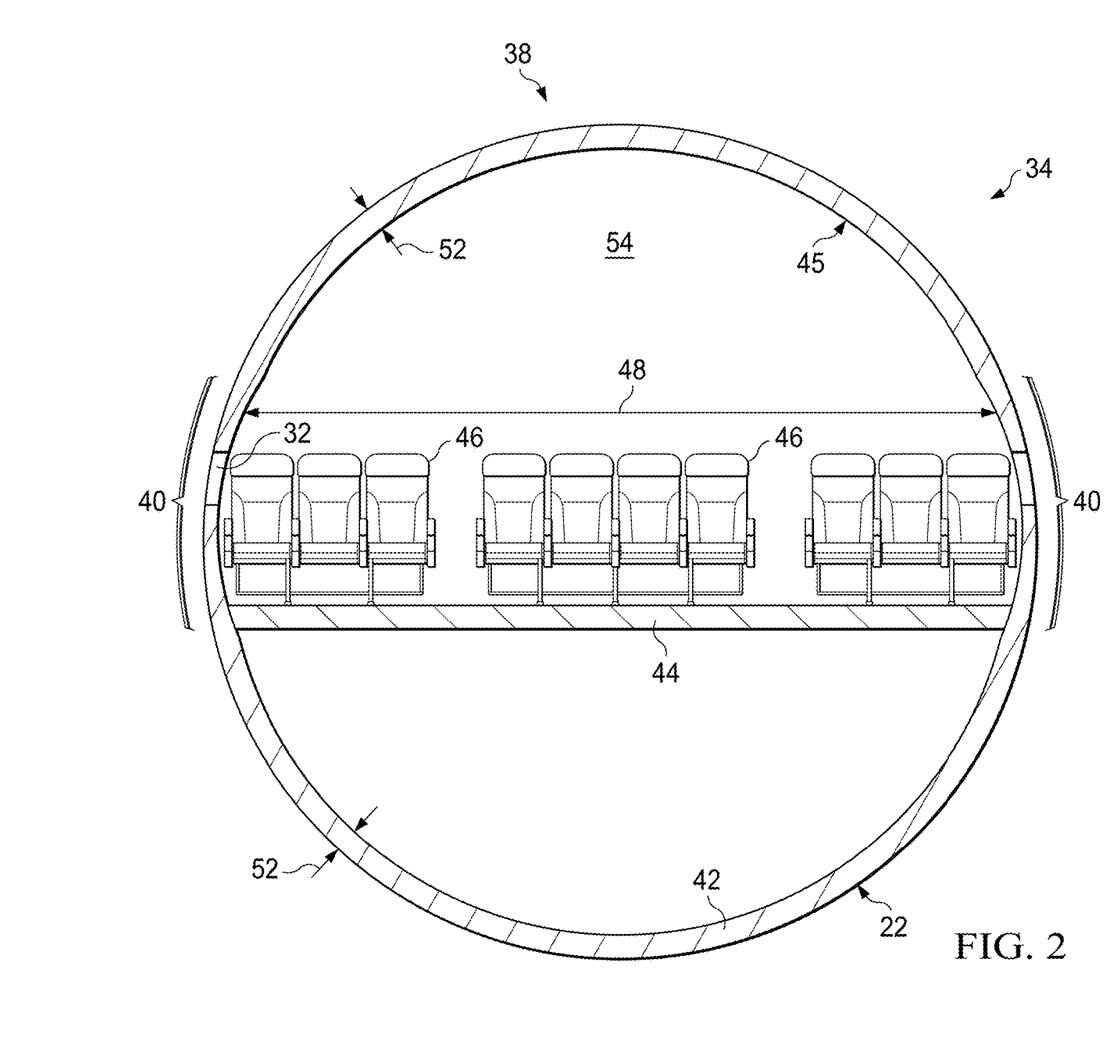
FIG. 2 is an illustration of a cross-sectional view taken along the line 2-2 in FIG. 1.

Referring first to FIGS. 1 and 2, an airplane 20 includes a fuselage 22, wings 24, engines 31 and an empennage 26 comprising a vertical stabilizer 28 and horizontal stabilizers 30. Fuselage 22 has an outer skin 60 covering structural airframe members which include barrel shaped frames 42, stringers (not shown), and similar stiffeners. The fuselage 22 has sidewalls 45 with one or more sculptured sections 40 along its length. The sidewalls 45 include cabin widows 32, and contain internal cavities (discussed later) that enclose functional system components such as air ducts, electrical conduits, etc. As shown in FIG. 2, sculpturing of the sidewalls 45 is achieved by reducing the thickness 52 of the frames 42 in the belt area 34 of the fuselage 22. This reduction in frame thickness 52 allows the sidewall 45 of the fuselage 22 to be sculptured outwardly, thereby increasing the width 48 of the cabin 54. In the disclosed example, the sculptured sections 40 of the sidewall 45 extend from the floor panel 44 to a point above the cabin windows 32 but below the crown 38. However, other sculpturing configurations are possible, depending on the airplane model. Moreover, as will be explained below, the concepts disclosed herein can be used in airplanes having sidewalls that are not sculptured.

Figure 3:
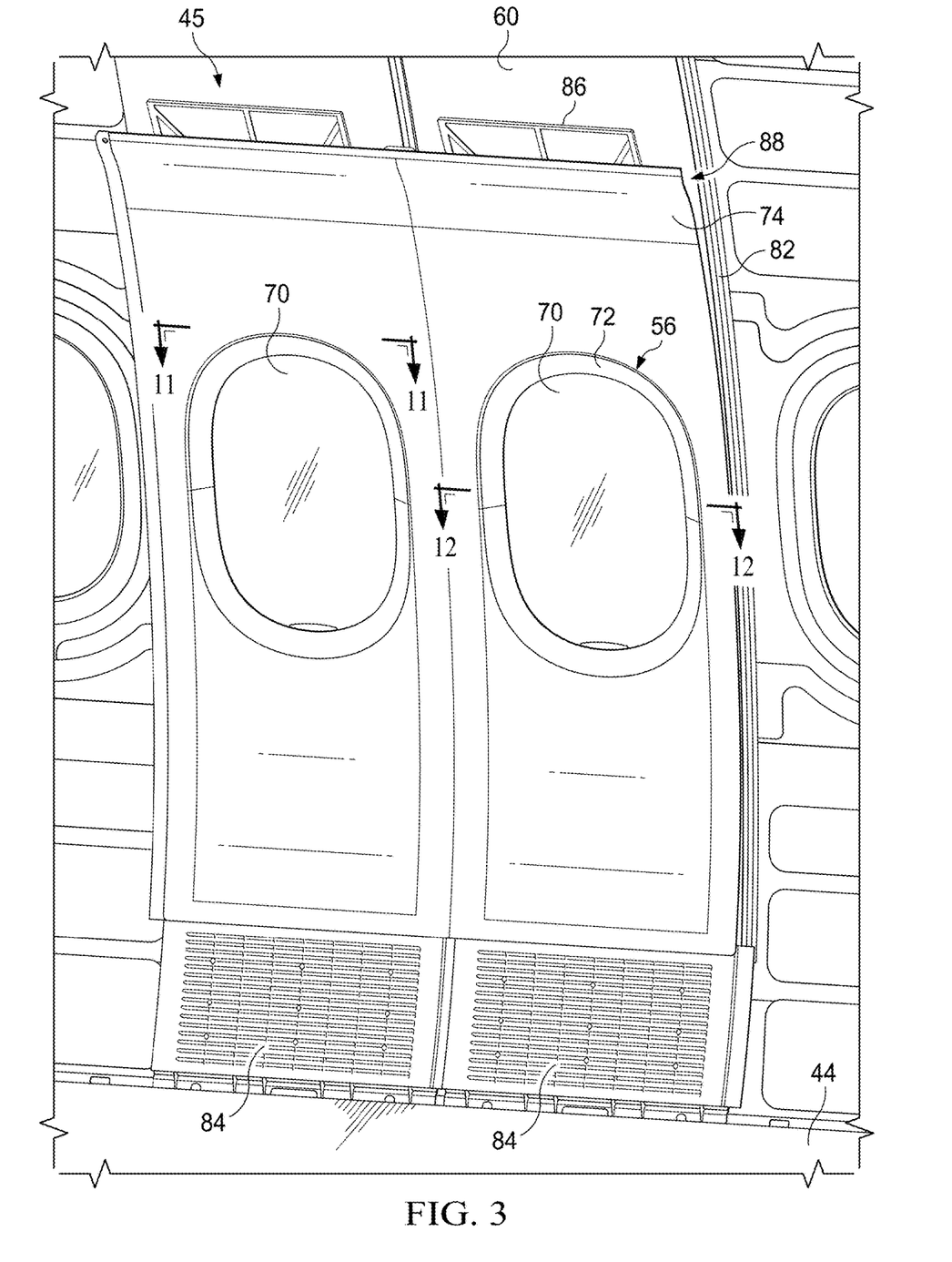
FIG. 3 is an illustration of a perspective view of an interior portion of the cabin of the airplane, portions of the sidewalls not shown.
Figure 10:
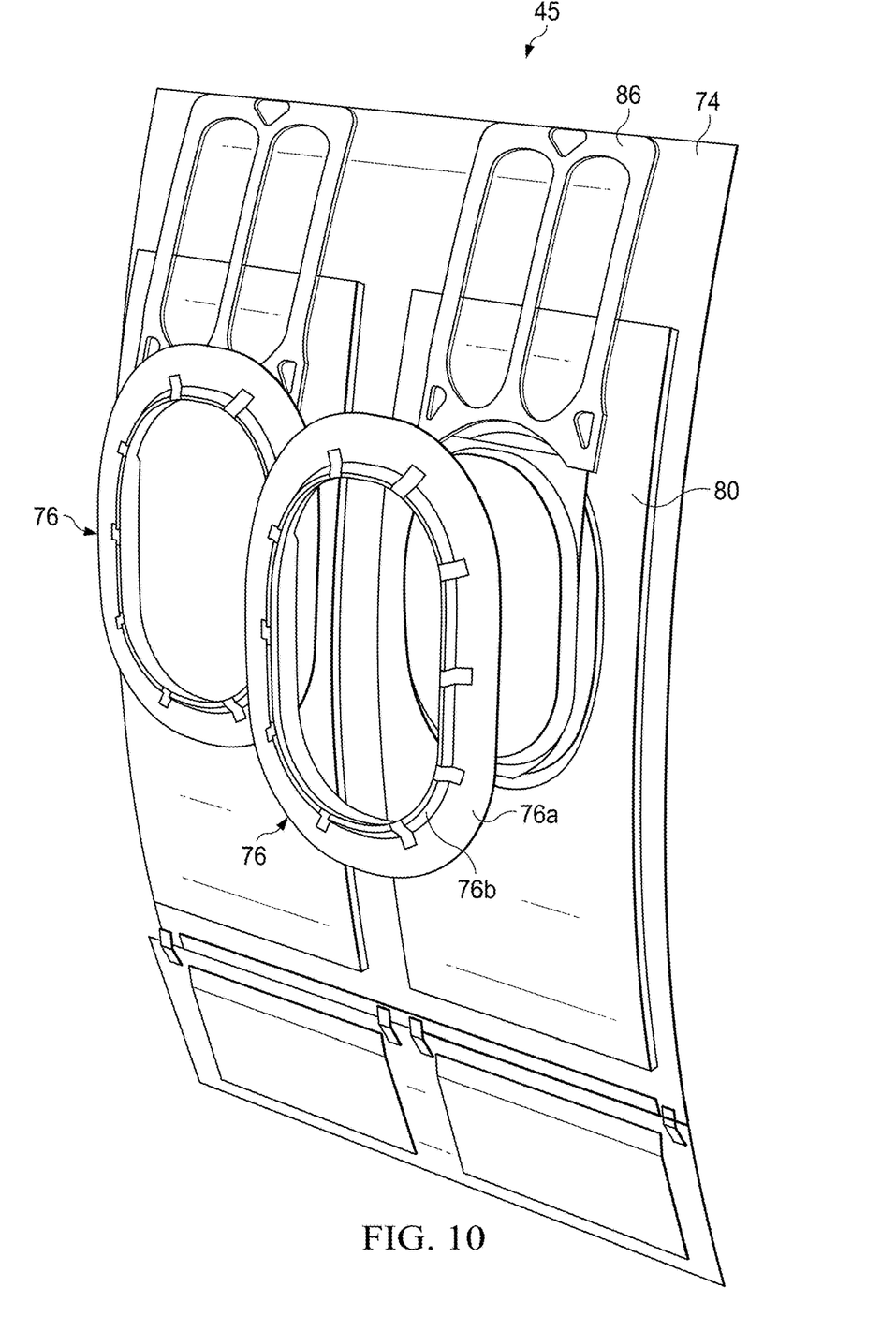
FIG. 10 is an illustration of a perspective view of the sidewall panel, with one of the window seals exploded.
Figure 11:
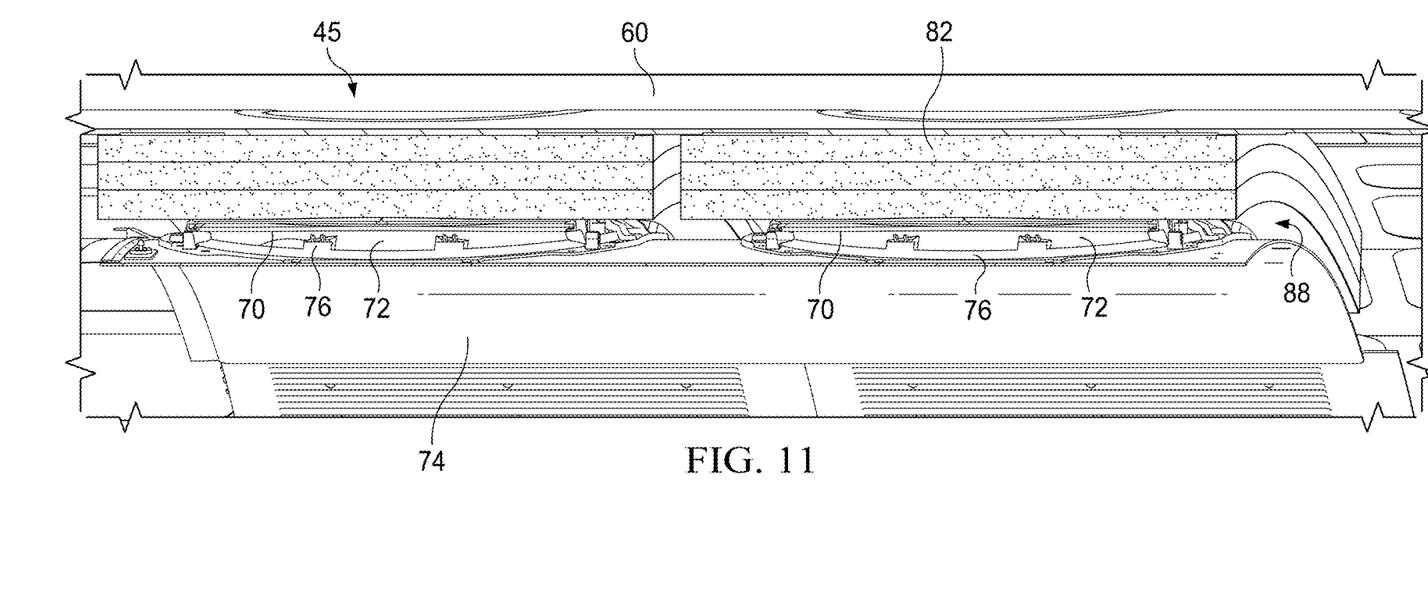
FIG. 11 is an illustration of a cross-sectional view taken along the line 11-11 in FIG. 3.
Figure 12:
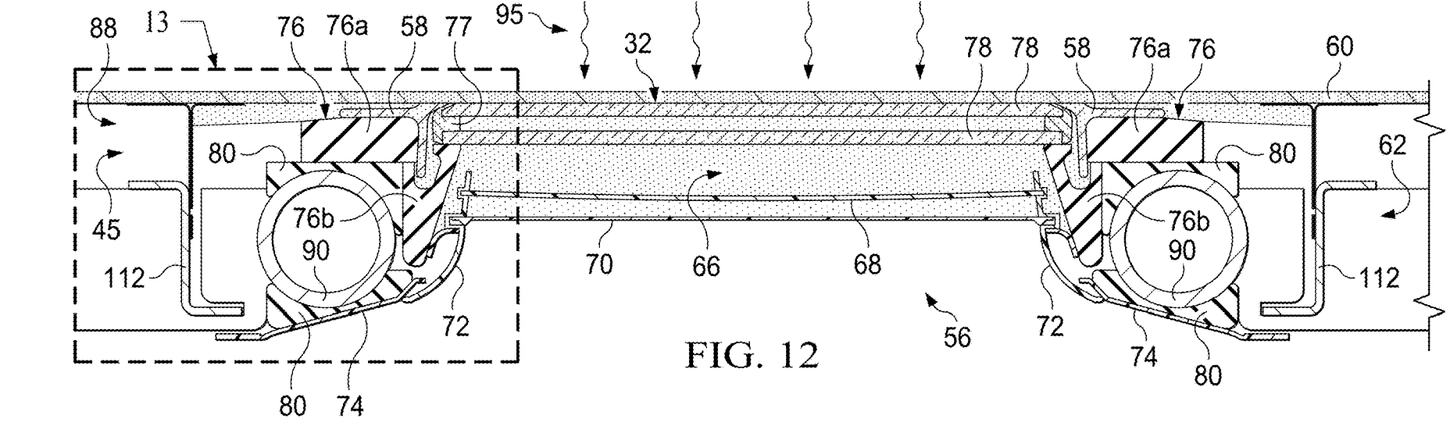
FIG. 12 is an illustration of a cross-sectional view taken along the line 12-12 in FIG. 3.
Figure 13:
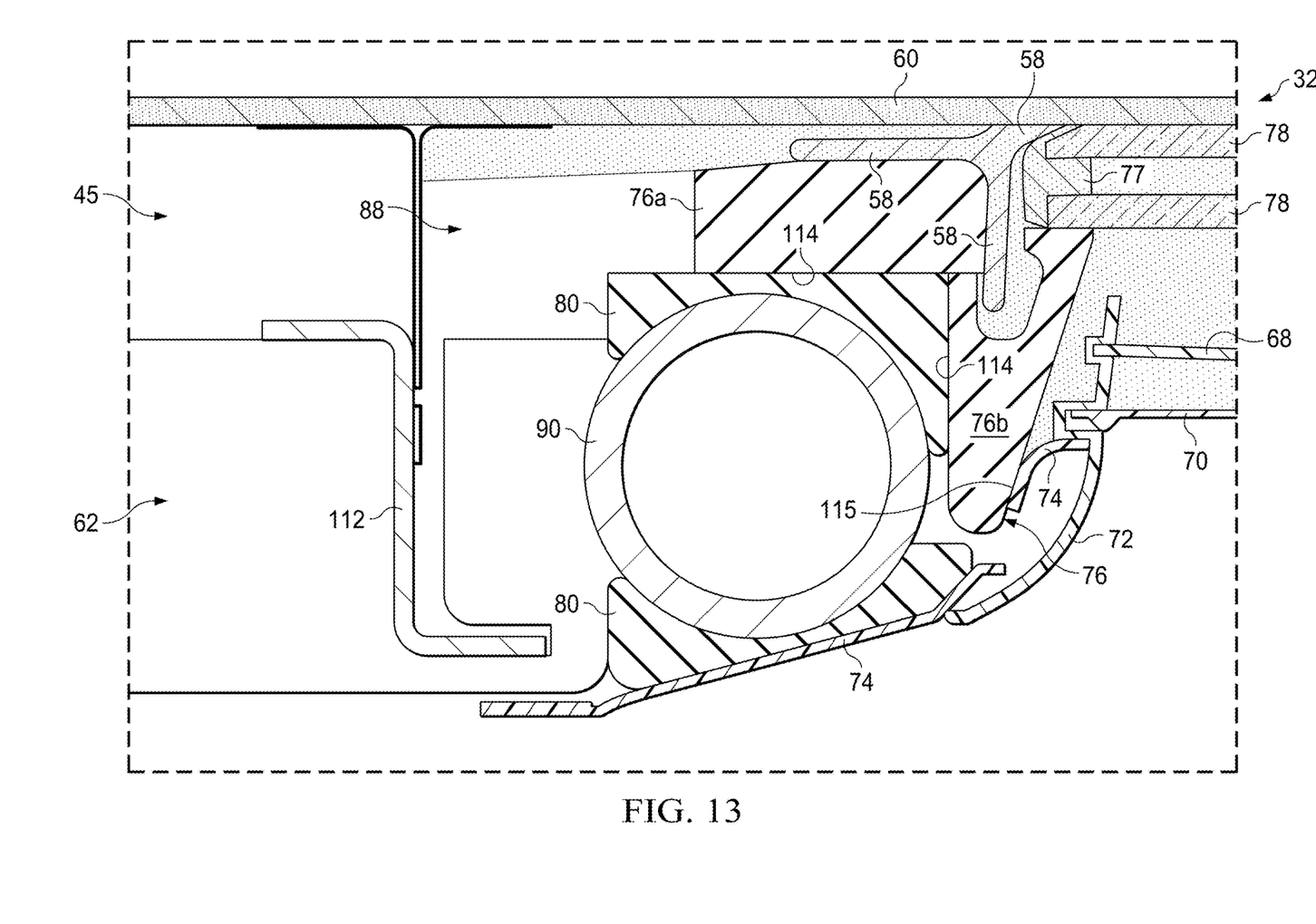
FIG. 13 is an illustration of the area designated as "FIG. 13" in FIG. 12.

Attention is now directed to FIGS. 3-13 which illustrate a fuselage sidewall 45 having a window assembly 56 provided with a collar-like seal 76 that insulates window 32 from cold air 95 (FIG. 12) inside the sidewall 45. As shown in FIG. 3, a decorative, inner sidewall panel 74 facing the interior of the cabin 54 extends upwardly from a floor panel 44 and is spaced from the skin 60, forming a sidewall cavity 62 (FIGS. 3, 12 and 13). Air grills 84 beneath the sidewall panels 74 deliver return air from the crown 38 of the fuselage 22 (FIG. 2) into the cabin 54. Each of the window assemblies 56 comprises a window frame 58 attached to the skin 60. A window 32 comprising a pair of glass panes 78 separated by a gasket 77 (FIG. 13) is mounted on the window frame 58. A reveal assembly 72 faces the cabin 54 and is mounted on the sidewall panel 74. A dust cover 68 and a slidable shade 70 are mounted on the reveal assembly 72. The dust cover 68 is separated from the window 32 by airspace 66. An outer window seal 96 (FIGS. 4 and 7) seals the window assembly 56 against the inboard side of the skin 60.

Figure 4:
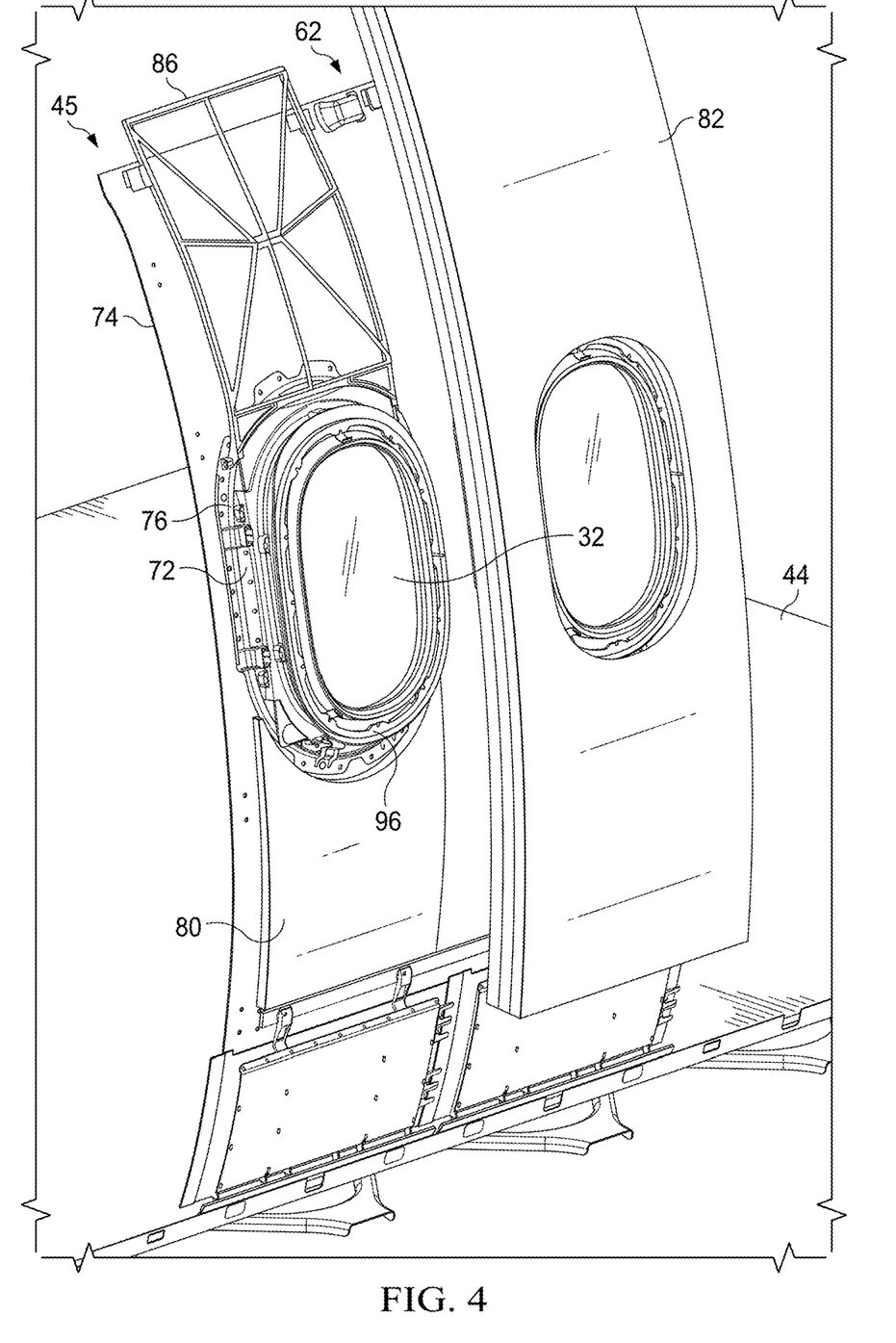
FIG. 4 is an illustration of an exterior perspective view of the cabin sidewall shown in FIG. 3, with portions of the sidewall insulation blanket and the outer skin not shown for clarity.
Figure 5:
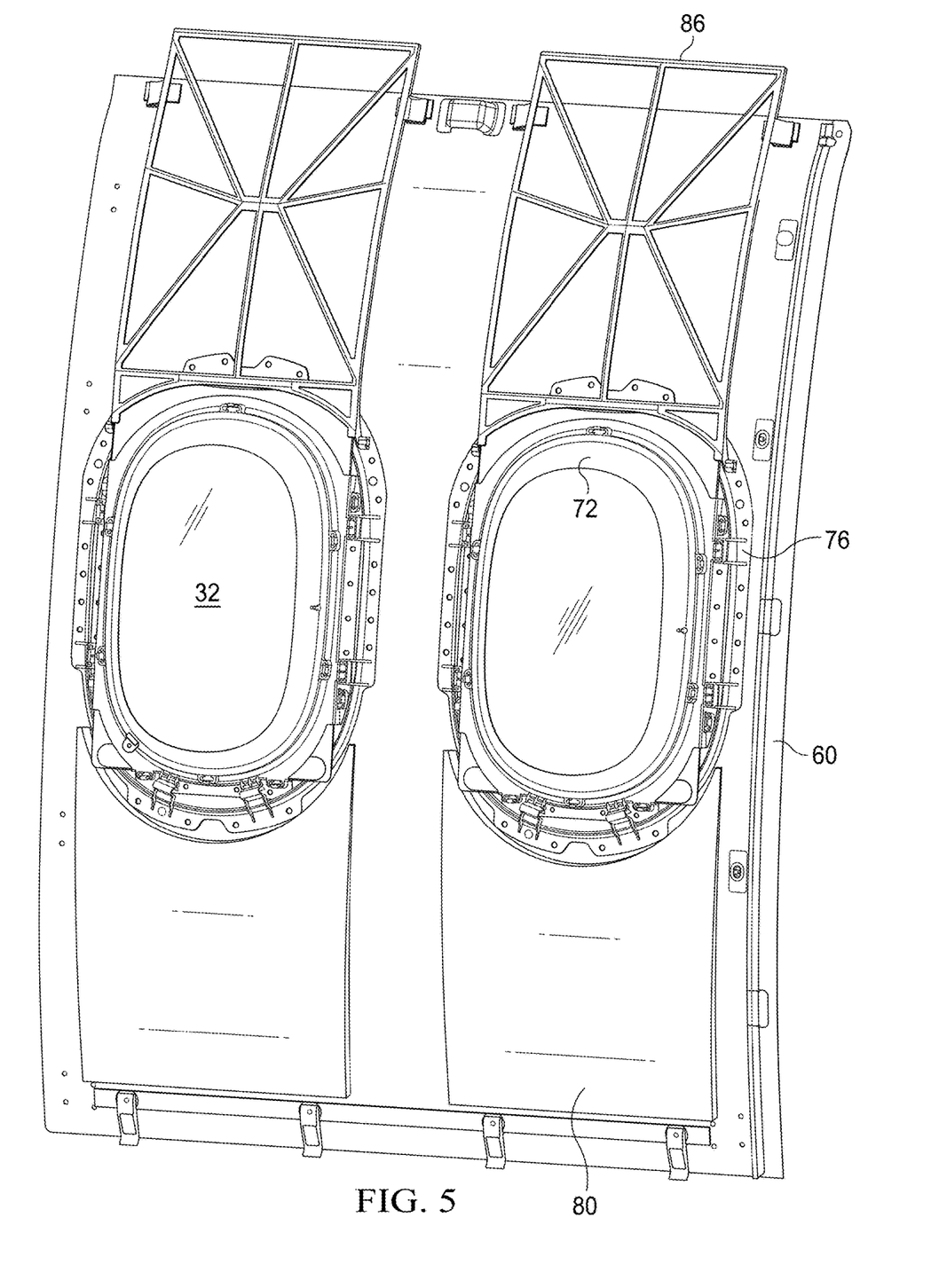
FIG. 5 is an illustration of an interior perspective view of the interior the cabin sidewall shown in FIG. 4.
Figure 6:
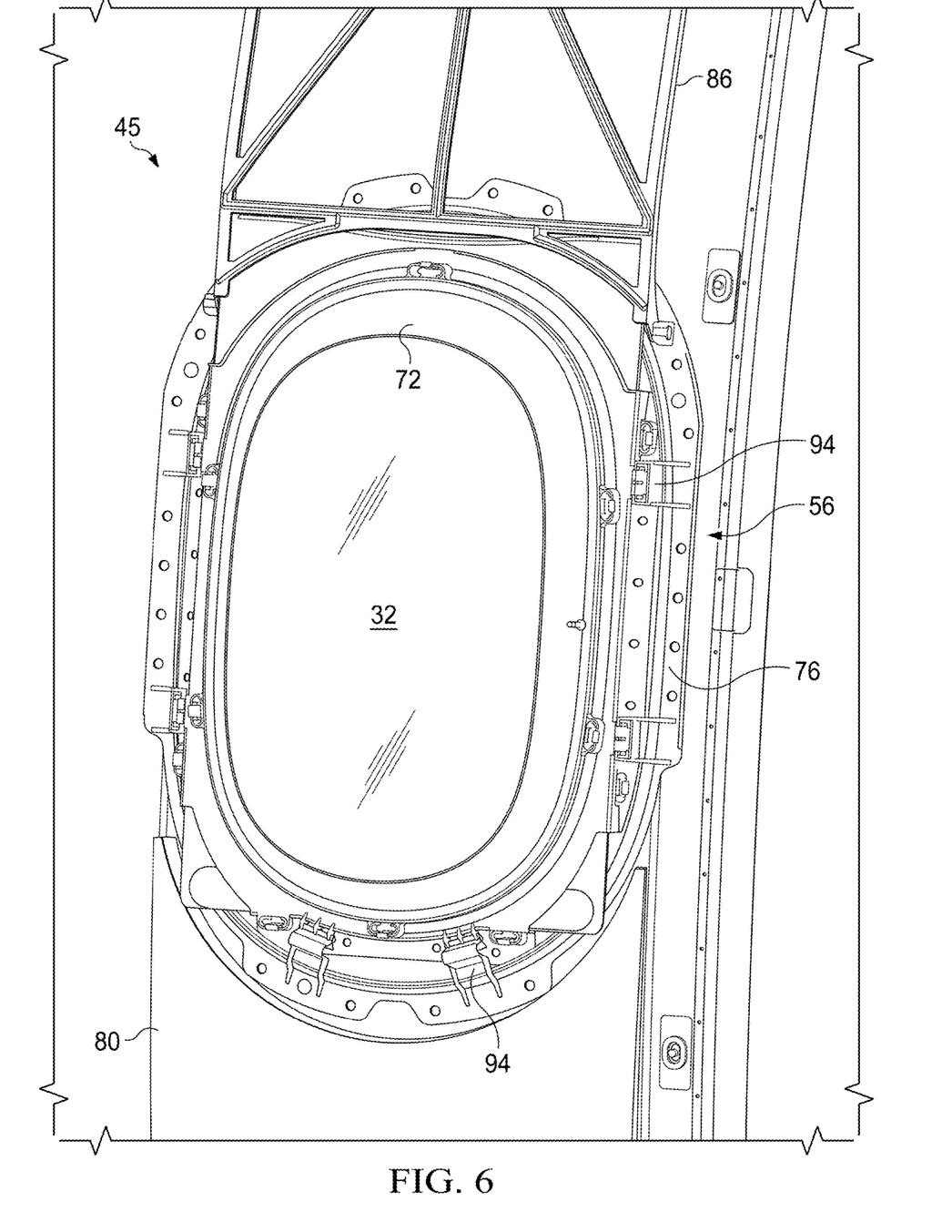
FIG. 6 is an illustration of a perspective view of an interior right side the window assembly.
Figure 7:
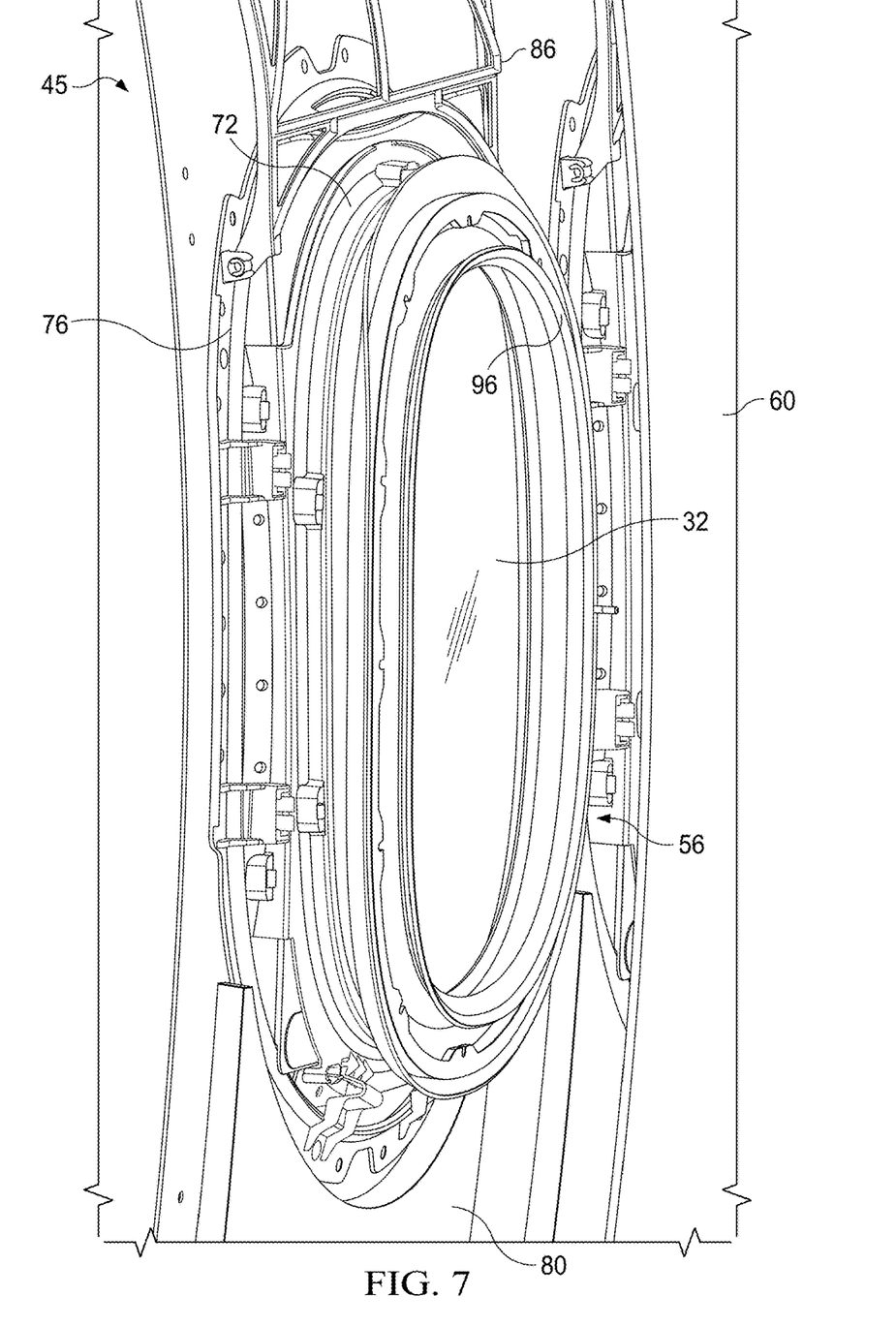
FIG. 7 is an illustration of a perspective view of an interior left side of the window assembly shown in FIG. 6.
Figure 8:
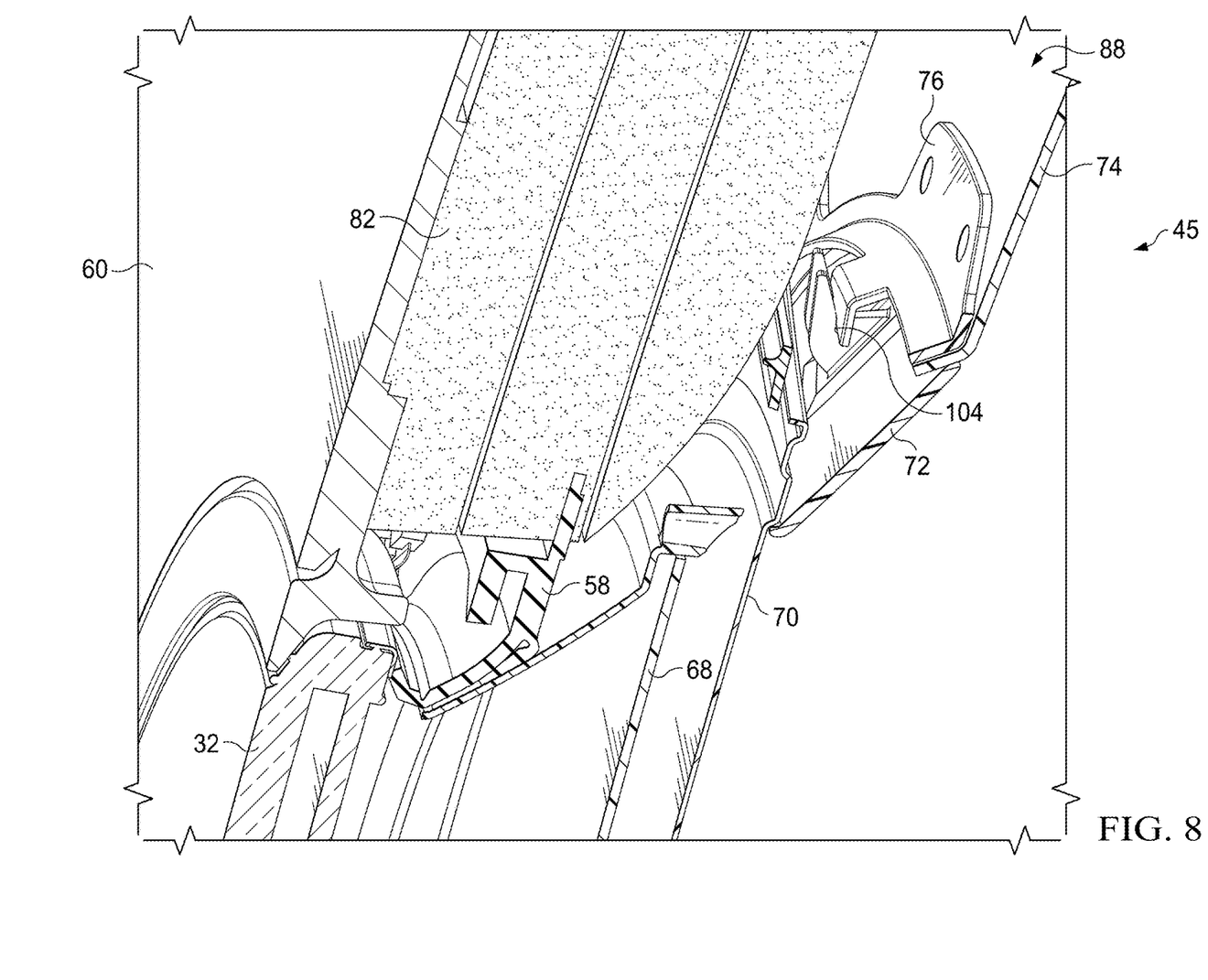
FIG. 8 is an illustration of a perspective, cross-sectional view showing additional details of the window assembly.
Figure 9:
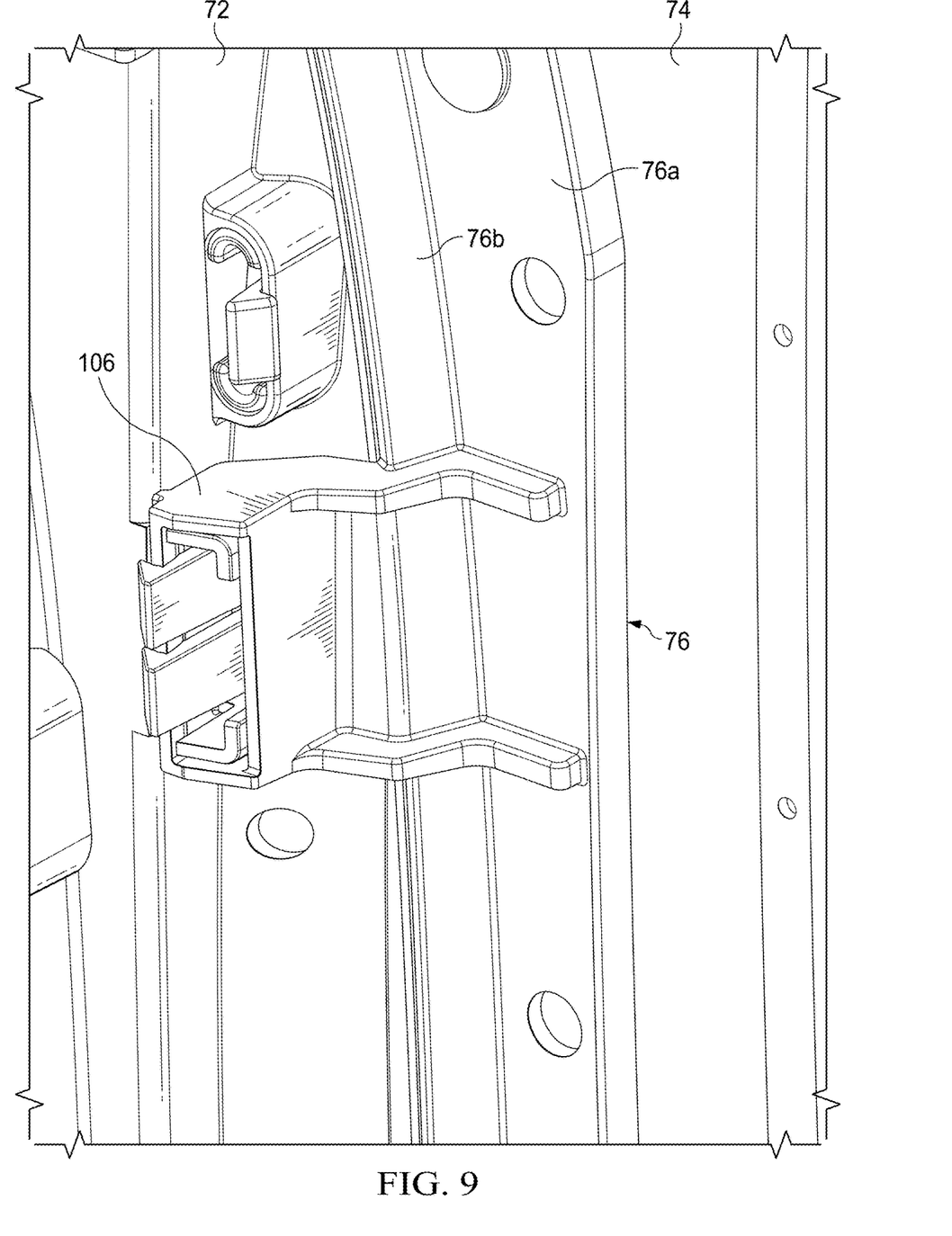
FIG. 9 is an illustration of a perspective view showing additional details of the window seal.

Various types and shapes of insulation are placed inside the sidewall cavity 62 in order to insulate the cabin 54 against the outside cold temperatures that can be −40° F. or lower. For example, as shown in FIGS. 4, 8 and 11, a multilayer thermal blanket 82 formed of insulating material such as fiberglass is placed between the sidewall 45 and the skin 60 in order to reduce conduction of the cold 95 from the skin 60 the through the sidewall 45 into the cabin 54. However, in spite of the use of the thermal blanket 82, crevices and gaps are present that form voids 88 within the sidewall cavity 62, particularly around certain structural features. Also, voids 88 may be present that are formed by small air gaps between the outboard side of the thermal blankets 82 and the inboard side of the skin 60, and between the inboard side of the thermal blankets 82 and the sidewall panel 74.

In order to prevent cold air from reaching the window 32, a seal 76 is provided that extends around the entire periphery of the window assembly 56, and presses against the inboard side of the sidewall panel 74. In one example shown in FIGS. 6-10, the seal 76 is of one-piece unitary construction, comprising a flat flange 76a and a continuous rib 76b that extends outwardly at a right angle from the flange 76a toward the skin 60. In another example shown in FIGS. 12 and 13, the flange 76a and the rib 76b comprise two separate pieces which may or may not be joined together as by using a suitable adhesive. The flange 76a seats flush against the outboard surface of the side panel 74. The rib 76b has integrally formed clips 106 that attach the seal 76 to the reveal assembly 72. The seal 76 seals off the window 32 from voids 88 within the sidewall cavity 62 where cold air may be present.

The seal 76 functions both as a physical barrier that blocks cold convection currents from reaching the window 32, and as an insulating thermal barrier that reduces thermal conduction between the voids 88 and the window 32. The seal 76 may be formed of any of various types of material having low thermal conductivity and other properties suitable for the application. For example, the seal 76 may be formed of a cross-linked closed cell rigid foam such as the PVDF (polyvinylidene fluoride) or other types of a thermoplastic fluoropolymer. The seal 76 can be produced by any of several known manufacturing processes, such as by molding, additive manufacturing, etc. It should be noted here that the seal 76 shown in the Figures is merely illustrative and has a geometry that is unique one particular application. In other window examples, the size, shape and/or features of the seal 76 can be tailored to the particular airplane configuration and/or window construction details. In the illustrated example, the seal 76 is used to insulate a cabin window 32 in a fuselage 22 having sculptured sidewalls 45, however it should be emphasized here that the seal 76 can be used to insulate cabin windows 32 in any of a variety of fuselages 22 having sidewalls 45 that are not sculptured.

Referring now to FIGS. 4-7 and 10, the seal 76 can be used in combination with a layer of insulation 80 installed on the inboard side of sidewall panel 74 immediately beneath the seal 76. In the Figures, the top of the insulation 80 is shown slightly spaced below the seal 76 to better show a lower edge of the seal 76. However, wherever possible, the top of the insulation 80 should be tightly fitted against the seal 76 such that the insulation 80 overlaps flanges 76a and abuts the rib 76b. In some examples however, as shown in FIG. 10, the insulation 80 is interposed between the seal 76 and the sidewall panel 74, and extends above the top of the seal 76. Thus, the entire periphery of the flange 76a is in contact with and is pressed against insulation 80, which in turn is in face-to-face contact with the inboard side of the sidewall panel 74. In this latter mentioned example, the combination of seal 76 and the insulation 80 form a thermal and physical barrier surrounding the window 32 that prevents cold inside sidewall voids 88 from reaching the window 32.

Referring to FIGS. 12 and 13, depending upon the location of the window 32 along the length of the fuselage 22, conduits such as a conduit 90 may be present immediately adjacent window 32. In this case, the cross-sectional shape of the seal 76 is configured to fill the void 88 in the area between the conduit 90 and the window assembly 56. In this example, insulation 80 can be seen to be tightly packed around the conduit 90 between the inboard side of the conduit 90 and the sidewall panel 74, and between the conduit 90 and the seal 76. Shown at 114 in FIG. 13, the seal 76 can be seen to be in face-to-face contact with the insulation 80, and at 115, the rib 76b of the seal 76 is likewise in face-to-face contact with a section of the reveal assembly 72. Thus, in this example, the combination of the insulation 80 and the seal 76 form both a thermal and complete physical barrier between the window 32 and the adjacent voids 88 within the sidewall 45.

Figure 14:
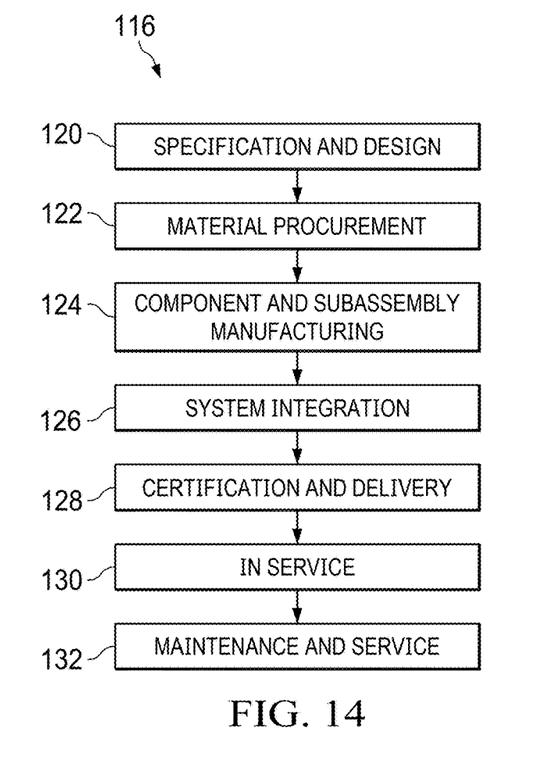
FIG. 14 is an illustration of a flow diagram of aircraft production and service methodology.
Figure 15:
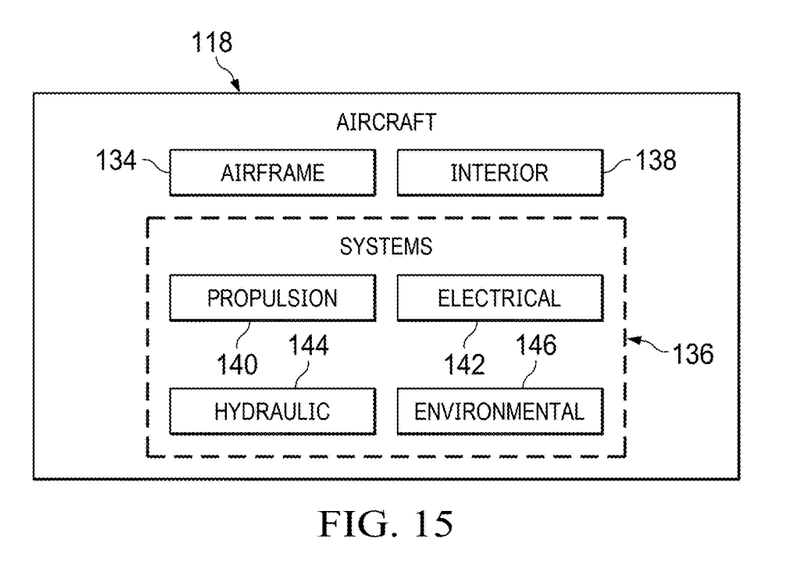
FIG. 15 is an illustration of a block diagram of an aircraft.

Examples of the disclosure may find use in a variety of potential applications, particularly in the transportation industry, including for example, aerospace, marine, automotive applications and other application where windows must be insulated against cold temperatures. Thus, referring now to FIGS. 14 and 15, examples of the disclosure may be used in the context of an aircraft manufacturing and service method 116 as shown in FIG. 14 and an aircraft 118 as shown in FIG. 15. During pre-production, the method 116 may include specification and design 120 of the aircraft 118 and material procurement 122. During production, component and subassembly manufacturing 124, and system integration 126 of the aircraft 118 take place. Thereafter, the aircraft 118 may go through certification and delivery 128 in order to be placed in service 130. While in service by a customer, the aircraft 118 is scheduled for routine maintenance and service 132, which may also include modification, reconfiguration, refurbishment, and so on.

Each of the processes of method 116 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 118 produced by method 116 may include an airframe 134, a plurality of high level systems 136, and an interior 138. Examples of high-level systems 136 include one or more of a propulsion system 140, an electrical system 142, a hydraulic system 144 and an environmental system 146. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 116. For example, components or subassemblies corresponding to component and subassembly manufacturing 124 may be fabricated or manufactured in a manner similar to components or subassemblies produced while the aircraft 118 is in service. Also, one or more apparatus examples, method examples, or a combination thereof may be utilized during the component and subassembly manufacturing 124 and system integration 126, for example, by substantially expediting assembly of or reducing the cost of an aircraft 118. Similarly, one or more of apparatus examples, method examples, or a combination thereof may be utilized while the aircraft 118 is in service, for example and without limitation, to maintenance and service 132.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A window assembly for aircraft having an outer skin and an inner sidewall panel separated by a sidewall cavity, comprising:
   a window frame configured to be attached to the outer skin;
   a window mounted on the window frame; and
   a seal surrounding the window inside the sidewall cavity, the seal being configured to form a barrier preventing cold air inside the cavity from reaching the window, and wherein the seal is formed of a type of insulating thermal material, and wherein the seal includes a flange in face-to-face contact with the inner sidewall panel and completely surrounding the window.

2. The window assembly of claim 1, wherein the seal is rigid foam.

3. The window assembly of claim 2, wherein the rigid foam is polyvinylidene fluoride.

4. The window assembly of claim 1, wherein the seal is of one-piece unitary construction.

5. The window assembly of claim 1, wherein the seal includes a rib completely surrounding the window and connected with the flange.

6. The window assembly of claim 5, wherein the flange and the rib are integrally formed together.

7. The window assembly of claim 1, further comprising a layer of insulation interposed between the seal and the inner sidewall panel.

8. The window assembly of claim 1, wherein:
   the sidewall cavity includes voids adjacent the window, and
   the seal fills the voids.

9. An aircraft fuselage, comprising:
   an outer skin;
   an inner sidewall panel separated from the outer skin by a sidewall cavity;
   insulation within the sidewall cavity configured to thermally insulate the inner sidewall panel from the outer skin;
   at least one window frame attached to the outer skin;
   a window mounted on the window frame; and
   a seal surrounding the window and configured to insulate the window from the sidewall cavity, and wherein the seal is formed of a type of insulating thermal material, and wherein the seal includes a flange pressed against and in face-to-face contact with the inner sidewall panel.

10. The aircraft fuselage of claim 9, further comprising an airframe having sculptured sections in which the sidewall cavity has reduced thickness.

11. The aircraft fuselage of claim 9, wherein the seal is closed cell foam.

12. The aircraft fuselage of claim 9, wherein the seal includes:
    a rib extending outwardly from the flange.

13. The aircraft fuselage claim 12, wherein the flange and the rib are integrally formed as a single piece.

14. The aircraft fuselage of claim 9, wherein the seal forms a physical barrier between the window and the sidewall cavity preventing a convection airflow within the sidewall cavity from reaching the window.

15. The aircraft fuselage of claim 9, further comprising:
a layer of insulation interposed between the seal and the inner sidewall panel.

16. The aircraft fuselage of claim 9, further comprising a layer of insulation in face-to-face contact with the inner sidewall panel and fitted around a periphery of the window.

17. A method of insulating an aircraft cabin window from cold air inside sidewall cavity, comprising:
installing a seal around the window in face-to-face contact with a sidewall of the cabin, wherein the seal is formed of a type of insulating thermal material, and wherein the seal includes a flange that completely surrounds the window.

18. The method of claim 17, wherein installing the seal includes placing the seal in voids within the sidewall cavity.

19. The method of claim 17, wherein installing the seal includes compressing the seal against the sidewall.

20. The method of claim 17, wherein installing the seal includes attaching the seal to a window assembly.

* * * * *